(12) United States Patent
Wurtenberger et al.

(10) Patent No.: US 7,881,240 B1
(45) Date of Patent: Feb. 1, 2011

(54) DYNAMIC CONFIGURATION OF EV-DO-A SLOT CYCLE INDEX BASED ON COMMUNICATION APPLICATION

(75) Inventors: Andrew M. Wurtenberger, Olathe, KS (US); Ryan S. Talley, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 696 days.

(21) Appl. No.: 11/627,215

(22) Filed: Jan. 25, 2007

(51) Int. Cl.
*H04W 28/16* (2009.01)
(52) U.S. Cl. ...................... 370/311; 370/345
(58) Field of Classification Search ............... 370/458, 370/311, 345
See application file for complete search history.

(56) References Cited

U.S. PATENT DOCUMENTS

| | | | |
|---|---|---|---|
| 4,870,408 A | 9/1989 | Zdunek et al. |
| 5,442,809 A | 8/1995 | Diaz et al. |
| 5,568,511 A | 10/1996 | Lampe |
| 5,710,591 A | 1/1998 | Bruno et al. |
| 5,818,836 A | 10/1998 | DuVal |
| 5,850,611 A | 12/1998 | Krebs |
| 5,884,196 A | 3/1999 | Lekven et al. |
| 5,936,964 A | 8/1999 | Valko et al. |
| 5,983,099 A | 11/1999 | Yao et al. |
| 6,014,556 A | 1/2000 | Bhatia et al. |
| 6,032,051 A | 2/2000 | Hall et al. |
| 6,041,241 A | 3/2000 | Willey |
| 6,119,017 A | 9/2000 | Cassidy et al. |
| 6,178,323 B1 | 1/2001 | Nagata |
| 6,381,467 B1 | 4/2002 | Hill et al. |
| 6,477,150 B1 | 11/2002 | Maggenti et al. |
| 6,490,452 B1 | 12/2002 | Boscovic et al. |
| 6,526,377 B1 | 2/2003 | Bubb |
| 6,564,049 B1 | 5/2003 | Dailey |
| 6,668,167 B2 | 12/2003 | McDowell et al. |
| 6,865,398 B2 | 3/2005 | Mangal et al. |
| 7,043,266 B2 | 5/2006 | Chaturvedi et al. |

(Continued)

FOREIGN PATENT DOCUMENTS

EP    0 817 457    1/1998

(Continued)

OTHER PUBLICATIONS

Non-Final Office Action from U.S. Appl. No. 10/067,080, mailed May 21, 2003.

(Continued)

*Primary Examiner*—Melvin Marcelo (57) ABSTRACT

Methods and systems are provided for dynamic configuration of the EV-DO-A slot cycle index based on communication application. In an exemplary embodiment, an access terminal: (1) executes a set of communication applications, each application associated with a respective slot cycle index; (2) identifies a desired slot cycle index at least in part by determining, among the respective slot cycle indexes associated with the set of executing applications, which slot cycle index is associated with the shortest slot cycle; (3) sends a request message to an access node, requesting the desired slot cycle index; (4) negotiates with the access node to agree on a negotiated slot cycle index; and (5) checks for pages from the access node according to a slot cycle that is determined at least in part by the negotiated slot cycle index.

13 Claims, 3 Drawing Sheets

U.S. PATENT DOCUMENTS

| | | |
|---|---|---|
| 2002/0034941 A1 | 3/2002 | Patil et al. |
| 2002/0055364 A1 | 5/2002 | Wang et al. |
| 2002/0058523 A1 | 5/2002 | Maggenti et al. |
| 2002/0071445 A1 | 6/2002 | Wu et al. |
| 2002/0145990 A1 | 10/2002 | Sayeedi |
| 2002/0147818 A1 | 10/2002 | Wengrovitz |
| 2002/0172165 A1 | 11/2002 | Rosen et al. |
| 2002/0172169 A1 | 11/2002 | Rosen et al. |
| 2002/0173308 A1 | 11/2002 | Dorenbosch et al. |
| 2002/0173325 A1 | 11/2002 | Rosen et al. |
| 2002/0173326 A1 | 11/2002 | Rosen et al. |
| 2002/0173327 A1 | 11/2002 | Rosen et al. |
| 2002/0177461 A1 | 11/2002 | Rosen et al. |
| 2002/0191583 A1 | 12/2002 | Harris et al. |
| 2002/0198008 A1 | 12/2002 | Smith et al. |
| 2003/0008657 A1 | 1/2003 | Rosen et al. |
| 2003/0021264 A1 | 1/2003 | Zhakov et al. |
| 2003/0032448 A1 | 2/2003 | Bulthuis et al. |
| 2003/0083045 A1 | 5/2003 | Blight et al. |
| 2003/0100326 A1 | 5/2003 | Grube et al. |
| 2003/0114156 A1 | 6/2003 | Kinnavy |
| 2003/0114174 A1 | 6/2003 | Walsh et al. |
| 2003/0119540 A1 | 6/2003 | Mathis |
| 2003/0125062 A1 | 7/2003 | Bethards et al. |
| 2004/0014456 A1 | 1/2004 | Vnnen |
| 2005/0036464 A1* | 2/2005 | Rajkotia et al. ............. 370/336 |
| 2005/0164741 A1* | 7/2005 | Rajkotia et al. ............. 455/561 |
| 2005/0186973 A1* | 8/2005 | Gaal et al. ................... 455/458 |
| 2006/0153139 A1* | 7/2006 | Bae et al. ..................... 370/335 |
| 2007/0060164 A1* | 3/2007 | Kim et al. .................... 455/450 |

FOREIGN PATENT DOCUMENTS

| | | |
|---|---|---|
| EP | 0 984 608 | 3/2000 |

OTHER PUBLICATIONS

Final Office Action from U.S. Appl. No. 10/067,080, mailed Apr. 27, 2004.

3rd Generation Partnership Project 2 (2002), "Fast Call Set-Up," 1-6.

Douskalis, (2000) "IP Technology: The Integration of Robust VoIP Services," 36-39.

Mobile Tornado, http://www.mobiletornado.com/products_iprsptt.html, printed from the World Wide Web on Jan. 27, 2003.

Qualcomm Chats Up "Push-to-Talk," http://siliconvalley.internet.com/news/print.php/953261, printed from the World Wide Web on Jan. 27, 2003.

Unpublished U.S. Appl. No. 10/277,465, filed Oct. 22, 2002 entitled "Method for Call Setup Using Short Data Bursts" (Sprint Docket No. 1999).

Office Action from U.S. Appl. No. 10/067,028, mailed Jun. 27, 2005.

Office Action from U.S. Appl. No. 10/067,028, mailed Dec. 14, 2004.

Schulzrinne and Rosenberg, "SIP Caller Preferences and Callee Capabilities," Internet Engineering Task Force, Internet Draft, Oct. 22, 1999.

Vakil et al., "Host Mobility Management Protocol Extending SIP to 3G-IP Networks," Internet Engineering Task Force, Internet Draft, Oct. 1999.

Ericsson, www.telecomcorridor.com/wireless%20horizons/1Coyne.pdf, printed from the World Wide Web on Jun. 27, 2001.

3rd Generation Partnership Project 2 '3GPP2', "interoperability Specification (IOS) for CDMA 2000 Access Network Interfaces—Part 3 Features," Nov. 2001.

OMA, "Discussion and definitions on PoC Floor Control, Input Contribution," Doc #OMA-REQ-2003-0375-PoC_Floor_Control, Jun. 2, 2003.

OMA, "PoC Use case: Mobile—PC Example," Input Contribution, DOC #OMA-REQ-2003-0323 PoC Mobile-PC use case, May 5, 2003.

OMA, "PoC Use case: Multimedia Group Call Example," Input Contribution, Doc #OMA-REQ-2003-0306-PoC UseCase-group-multimedia-scenario, May 6, 2003.

OMA, "PoC Use Case: Examples of User Requirements," Input Contribution, DOC #OMA-REQ-2003-0305-PoC Use Case, May 6, 2003.

OMA, "Inputs for PoC Requirements Document," Input Contribution, Doc #OMA-REQ-2003-0367-PoC_Input_Motorola, May 29, 2003.

OMA, "Push to Talk over Cellular (PoC)," Version 0.1.6, May 12, 2003.

Final Rejection for U.S. Appl. No. 10/067,028, mailed Nov. 2, 2005.

* cited by examiner

FIG. 1

| APPLICATION | SLOT CYCLE INDEX |
|---|---|
| PTT | -2 |
| IM | 0 |
| WEB | 2 |

CORRELATION DATA 200

DYNAMIC CONFIGURATION OF EV-DO-A SLOT CYCLE INDEX BASED ON COMMUNICATION APPLICATION

BACKGROUND

1. Technical Field

The present invention relates to wireless communications, and, more particularly, to configuration of access nodes and access terminals in wireless communication systems.

2. Description of Related Art

Many people use mobile stations, such as cell phones and personal digital assistants (PDAs), to communicate with cellular wireless networks. These mobile stations and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." These networks typically provide communication services such as voice, Short Message Service (SMS) messaging, and packet-data communication.

Recently, service providers have introduced mobile stations and wireless networks that communicate using a protocol known as EV-DO, which stands for "Evolution Data Optimized." EV-DO networks, operating in conformance with industry specification IS-856, provide high rate packet-data service (including Voice over IP (VoIP) service) to mobile stations using a combination of time-division multiplexing (TDM) on the forward link (from the network to mobile stations) and CDMA technology on the reverse link (from mobile stations to the network). Furthermore, some mobile stations, known as hybrid mobile stations or hybrid access terminals, can communicate with both 1x networks and EV-DO networks.

In the EV-DO context, a mobile station is typically referred to as an access terminal, while the network entity with which the access terminal communicates over the air interface is known as an access node. The access node typically includes a device known as a radio network controller (RNC), which is similar to a base station controller (BSC) in 1x networks. The access node also includes one or more base transceiver stations (BTSs) or "Node-Bs," each of which include one or more antennas that radiate to define respective wireless coverage areas. Among other functions, the RNC controls one or more BTSs, and acts as a conduit between the BTSs and an entity known as a packet data serving node (PDSN), which provides access to a packet-data network. Thus, when positioned in one of these wireless coverage areas, an access terminal may communicate over the packet-data network via the access node and the PDSN.

In addition to VoIP communication, access terminals frequently engage in other types of packet-data communication, such as instant messaging (IM) and web browsing. Each instance of an access terminal engaging in a type of packet-data communication for a period of time may be deemed a "packet flow," which would typically involve Internet Protocol (IP) packets being sent and received by the access terminal. For example, a given VoIP call may be referred to as a VoIP packet flow. Thus, as examples, an access terminal may engage in VoIP packet flows, IM packet flows, push-to-talk (PTT) packet flows, streaming-video packet flows, streaming-audio packet flows, video-telephony packet flows, and best-effort packet flows such as web-browsing packet flows and file-transfer-protocol (FTP) packet flows.

To address the fact that access terminals engage in these various types of packet flows, a particular revision of EV-DO specifications, known as EV-DO Rev. A ("EV-DO-A"), provides for what are known as profile IDs, which are identifiers associated on a one-to-one basis with types of packet flows. Thus, one profile ID may be associated with VoIP packet flows (i.e., "conversational voice"), while another may be associated with best-effort packet flows, and so on. Again, an access terminal may be able to communicate according to more than one profile ID, which is another way of stating that it can engage in more than one type of packet flow.

Furthermore, to be able to participate in one or more of these various types of packet flows, an access terminal may run (i.e., launch, enable, execute, etc.) particular communication applications, perhaps in response to receiving one or more user commands. As an example, to be able to participate in push-to-talk (PTT) packet flows, the access terminal may enable a PTT application. As another example, to be able to participate in IM packet flows, an access terminal may run an IM application. As yet another example, to be able to engage in web-browsing packet flows, an access terminal may launch a web browser.

To initiate connectivity, when powered on in a coverage area of an access node, an access terminal may send what is known as a Universal Access Terminal Identifier (UATI) request to the access node. The access node may respond by granting a UATI to the access terminal in a message known as a UATI response. This UATI response typically contains the granted UATI, which then serves to identify the access terminal to the access node for some period of time.

After acquiring a UATI, the access terminal will typically communicate with the access node over the air interface to set up what is referred to as a "session." Essentially, an access terminal that has a session with an access node can engage in packet-data communication over the packet-data network to which the access node and the PDSN provide access. Conversely, an access terminal that does not have a session with an access node can not engage in packet-data communication over the packet-data network.

As part of setting up the session, the access terminal sends a connection request to the access node, requesting an air-interface connection. The access node will responsively work to establish the air-interface connection with the access terminal, which involves the access node instructing the access terminal to communicate with the access node over what is known as a traffic channel. This traffic channel takes the form of particular timeslots on the forward link, during which the access node sends data to the access terminal, and a particular CDMA channel on the reverse link, over which the access terminal sends data to the access node.

In addition to establishing the connection with the access terminal, the access node takes a number of other actions, one of which is to validate that the access terminal is authorized to engage in communication via the access node. Another such action is to set up a radio-packet (e.g., A10/A11) connection between the access node and the PDSN for the access terminal. The access node also facilitates establishment of a data link (e.g., a point-to-point protocol (PPP) connection) between the access terminal and the PDSN. The access node may also facilitate assignment (e.g., by the PDSN or by a Mobile-IP home agent) of an IP address to the access terminal. Finally, the access terminal and the access node negotiate over the traffic channel to agree on a set of profile IDs for the access terminal to use during the session; in other words, they agree as to the types of packet flows in which the access terminal is capable of engaging and in which the access terminal is permitted to engage.

Once those steps are complete, the access terminal has a session with the access node, and can therefore communicate over the packet-data network via the access node and the PDSN, according to the agreed-upon set of profile IDs. Typically, the air-interface connection is then torn down, freeing up those resources for other access terminals. Both the network and the access terminal maintain data pertaining to the rest of what was established, however, including the IP address, radio-packet connection, and data link. This transition from having a traffic channel to not having one is referred to as the access terminal going from active to dormant.

Thereafter, if the access terminal wants to initiate packet-data communication, it will send another connection request to the access node, which will then assign a traffic channel to the access terminal. If, on the other hand, the access terminal receives data addressed to the access terminal, the access node would typically send a page to the access terminal over a common paging channel, which takes the form of certain timeslots on the forward link. Perhaps in that page, or in an ensuing message, the access node will assign a traffic channel to the access node. The access terminal can then engage in one or more packet flows of any of the negotiated types, over the packet-data network, using the assigned traffic channel, as well as the previously-established IP address, radio-packet connection, and data link.

As part of setting up a packet flow, either the access terminal or the access node, or both, may send the other a message known as a ReservationOnRequest (RoR). The RoR includes at least one profile ID, which indicates the type of packet flow that is being requested. Once an RoR has been sent and acknowledged, the access terminal has an "open reservation" on the assigned traffic channel. This open reservation is associated with the profile ID that was included in the RoR; in other words, the open reservation is associated with the type of packet flow in which the access terminal is then able to engage. Note that an access terminal may have more than one open reservation on the assigned traffic channel at one time, corresponding to the fact that the access terminal can engage in more than one packet flow at one time.

The network typically uses this profile-ID information to apply a particular quality of service (QoS) to the packet flow, which essentially means providing a particular level of packet forwarding (or "expedited forwarding") treatment to certain packet flows. This traffic shaping is also known as "DiffServ" ("differentiated services"). Thus, a profile ID effectively represents a set of QoS characteristics to be applied to a packet flow.

SUMMARY

Methods and systems are provided for dynamic configuration of the EV-DO-A slot cycle index based on communication application. In one aspect, an exemplary embodiment may take the form of a method, in accordance with which an access terminal (1) executes a set of communication applications, each application associated with a respective slot cycle index; (2) identifies a desired slot cycle index at least in part by determining, among the respective slot cycle indexes associated with the set of executing applications, which slot cycle index is associated with the shortest slot cycle; (3) sends a request message to an access node, requesting the desired slot cycle index; (4) negotiates with the access node to agree on a negotiated slot cycle index; and (5) checks for pages from the access node according to a slot cycle that is determined at least in part by the negotiated slot cycle index.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

Among the parameters that pertain to the communication between the access node and the access terminal is a parameter known as the "slot cycle index." As mentioned above, on an EV-DO-A system, the paging channel is used by the access node to page an access terminal, to indicate that the access node has data to send to the access terminal. With a particular degree of frequency, each access terminal checks the paging channel for any pages directed to that access terminal. That degree of frequency is controlled by the slot cycle index.

For example, an access terminal using a slot cycle index of 2 may check for pages every 5.12 seconds, with the access node correspondingly using the same period for scheduling pages to the access terminal. As further examples, a slot cycle index of 1 could correspond to a period of 2.56 seconds, 0 to 1.28 seconds, −1 to 0.64 seconds, and −2 to 0.32 seconds. Thus, while other implementations are certainly possible, it could be the case that, the lower the slot cycle index, the more frequently the access node schedules pages to the access terminal, and the more frequently the access terminal checks for pages. Note that an access node may receive data for an access terminal at any point in the period that is set by the slot cycle index. Thus, on average, the access node will have to wait half of that period before paging the access node.

Note that both the access node and the access terminal operate in a synchronized manner according to a common clock, which may be Global Positioning System (GPS) time. And both know the slot cycle index for the access terminal. As such, the access node schedules pages for the same time at which the access terminal checks for them. And it should be noted that current implementations involve access nodes using the same slot-cycle-index value for all access terminals, regardless of the type(s) of packet flow(s) in which they are engaging, or of the one or more communication applications that they currently have enabled.

Note that an EV-DO access terminal can check the EV-DO paging channel whether or not it is currently involved in a packet flow on an EV-DO traffic channel. In 1x networks, mobile stations cannot, over the same time period, monitor the paging channel and communicate on a traffic channel, both of which are Walsh-coded CDMA channels. As stated, however, EV-DO networks use TDM on the forward link, so access terminals can both monitor the paging channel and communicate on a traffic channel over the same time period. Note that the access terminal can do this at what is effectively, but not actually, the same exact time, due to the TDM nature of the EV-DO forward link.

Note that certain types of packet flows require a better QoS than others. That is, there are latency-sensitive packet flows, such as VoIP packet flows, that require expedited (i.e. prioritized) forwarding of packets, and there are latency-tolerant packet flows, such as web-browsing packet flows ("best-effort packet flows" generally), for which expedited forwarding is not necessary. It is also generally desirable for setup times to be minimized for latency-sensitive packet flows. For example, it is desirable to set up PTT and IM packet flows quickly. Thus, according to the present invention, certain access-terminal applications may be considered latency-sensitive, while others may be considered latency-tolerant. As examples, a PTT application may be considered latency-sensitive, while a web browser may be considered latency-tolerant.

Therefore, in addition to applying a higher QoS to packets associated with a latency-sensitive application, it would also be advantageous to associate a lower slot cycle index with an access terminal that currently has such an application enabled. This way, when that access terminal is, for example, called by another user, the page message to alert the access terminal of the call will be received more quickly. Conversely, a higher slot cycle index may be appropriate for an access terminal that is currently running only latency-tolerant applications. This way, it will not check for pages with a high degree of frequency, which would drain battery power. Furthermore, network resources dedicated to paging would be used frequently for access terminals running latency-sensitive applications and less frequently for access terminals that are not, which will result in a more efficient use of those network resources.

In operation, upon setting up a session, an access terminal may be assigned by the access node to use a default value for its slot cycle index, such as 2. At that time or thereafter, the access terminal may determine that it wants to enable one or more communication applications that are latency-sensitive. This could involve placing a VoIP call, enabling a PTT application, launching an IM application, as well as numerous other examples. The access terminal may responsively send a request message to the access node, requesting that the access terminal be assigned a slot cycle index that is lower than that default value.

The access terminal and the access node may then negotiate to establish a slot-cycle-index value for the access terminal. In the initial request, or at some other point in this negotiation, the access terminal may indicate to the access node why the access terminal is requesting the lower slot cycle index. In other words, the access terminal may convey to the access node an indication of one or more of the applications that the access terminal has enabled, will be enabling, or wishes to enable.

The access node may then responsively assign the requested slot cycle index to the access terminal. The access node may instead to assign some other slot cycle index to the access terminal, or perhaps deny the request altogether, which would result in the access terminal still having the default slot-cycle-index value. Depending on which of these results the access terminal obtains, the access terminal may decide not to enable one or more of the communication applications that gave rise to the request in the first instance.

To facilitate operation of the present invention, the access terminal, or perhaps both the access terminal and the access node, may maintain data that correlates particular applications with particular slot-cycle-index values. And there is no need for only two classifications of applications (i.e., latency-sensitive and latency-tolerant). Any groupings of applications could be used, associated with any number of slot-cycle-index values. Note that hybrid access terminals may negotiate with the access node and with the 1x network to arrive a situation where the hybrid access terminals would check for pages on the EV-DO network and on the 1x network at different times, so that neither page-checking process would interfere with the other.

Note that an access terminal may base its decision as to what slot-cycle-index value to request on whichever application is the most latency-sensitive, among the applications that it wishes to run or among those that it is currently running. Thus, an access terminal that is running both an IM application and a web browser would request the same slot cycle index as an access terminal that is running just the IM application, since the IM application would be, in this example, the more latency-sensitive of the two. Furthermore, a given access terminal may request a different slot cycle index each time there is a change in the set of applications that it is running, where that change results in a different slot cycle index being associated with the most latency-sensitive, currently-running application.

Advantageously, the present invention tailors the slot cycle index to the applications running on particular access terminals, to ensure that the latency requirements of each access terminal are met. Furthermore, battery power is conserved on access terminals that are running only latency-tolerant applications, by using a relatively longer slot cycle, that is, a higher value for the slot cycle index and a corresponding lower frequency of checking for pages.

2. Exemplary Architecture a. Exemplary Communication System

Figure 1:
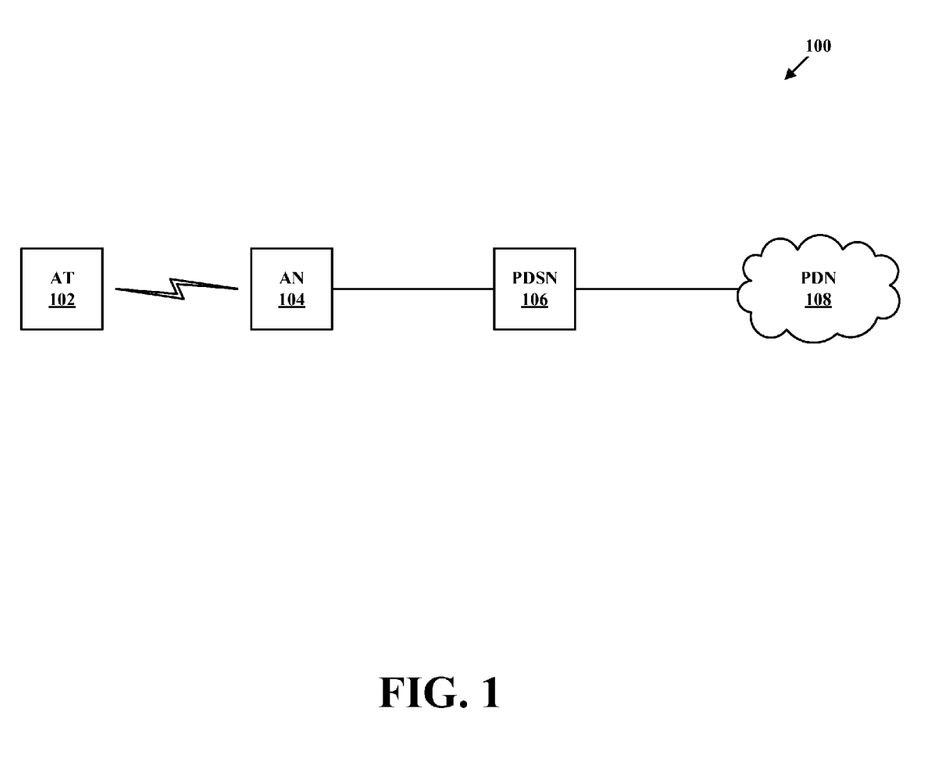
FIG. 1 is a simplified block diagram of a communication system, in accordance with exemplary embodiments.

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes an access terminal 102, an access node 104, a PDSN 106, and a packet-data network (PDN) 108. Note that additional entities not depicted in FIG. 1 could be present as well. As an example, there could be more than one access terminal in communication with access node 104; furthermore, there could be additional entities in communication with PDN 108. Also, there could be one or more devices and/or networks making up at least part of one or more of the communication links depicted in FIG. 1. As an example, there could be one or more routers, switches, or other devices or networks on the link between PDSN 106 and PDN 108.

Access terminal 102 may be any mobile device arranged to carry out the access-terminal functions described herein. As such, access terminal 102 may include a user interface, a wireless-communication interface, a processor, and data storage comprising instructions executable by the processor for carrying out those functions. The user interface may include buttons, a touch-screen, a microphone, and/or any other elements for receiving inputs, as well as a speaker, one or more displays, and/or any other elements for communicating outputs.

The wireless-communication interface may comprise an antenna and a chipset for communicating with one or more access nodes over an air interface. As an example, the chipset could be one suitable for engaging in EV-DO communications. The chipset or wireless-communication interface in general may also be able to communicate with a CDMA network, a Wi-Fi (IEEE 802.11) network, and/or one or more additional types of wireless networks. The processor and data storage may be any suitable components known to those of skill in the art. As examples, access terminal 102 could be or include a cell phone, a PDA, a computer, a laptop computer, a hybrid IS-2000/IS-856 device, and/or a multi-mode Wi-Fi/cellular device.

Furthermore, access terminal 102 may store data that correlates particular slot cycle indexes with particular communication applications. As an example, access terminal 102 may store a table such as that shown as correlation data 200 of FIG. 2. That table shows three different communication applications, each associated with a different slot cycle index value. A PTT application is correlated with a slot cycle index of −2, which, in this example, corresponds with a slot cycle of 0.32 seconds. An IM application is correlated with a slot cycle index of 0, which, in this example, corresponds with a slot cycle of 1.28 seconds. Lastly, a web browser is correlated with a slot cycle index of 2, which, in this example, corresponds with a slot cycle of 5.12 seconds. And many other examples and ways of organizing the data are possible as well.

Figure 2:
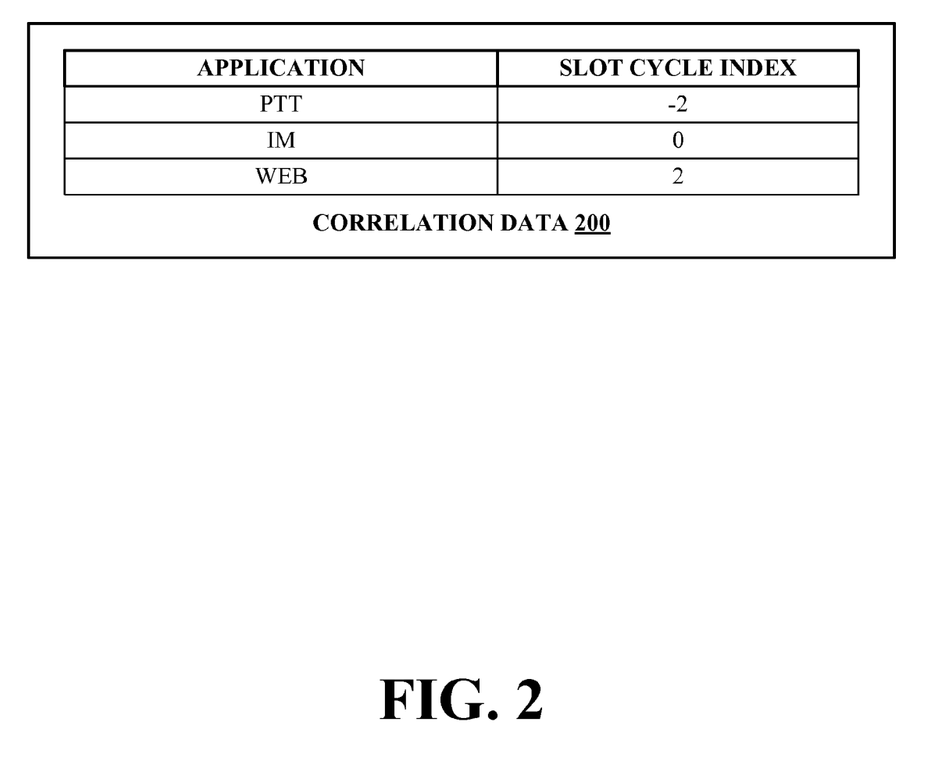
FIG. 2 is a simplified block diagram of correlation data, in accordance with exemplary embodiments.

Returning to FIG. 1, access node 104 may be any one or any combination of network elements arranged to carry out the access-node functions described herein. As such, access node 104 may include a communication interface, a processor, and data storage comprising instructions executable by the processor to carry out those functions. The communication interface may include one or more antennas and chipsets or other components for providing one or more EV-DO coverage areas such as cells or sectors, for communicating with access terminals such as access terminal 102. The communication interface may also include a wired packet-data interface such as an Ethernet interface for communicating directly or over one or more networks with PDSN 106. Access node 104 may include one or more base transceiver stations (BTSs) (or "Node-Bs"), as well as one or more radio network controllers (RNCs). Furthermore, access node 104 may store—or have access to—data similar to correlation data 200, which correlates various communication applications with various slot cycle indexes.

Moreover, access node 104 may include instructions executable by its processor to receive a request message from access terminal 102, requesting a particular slot cycle index. In particular, access terminal 102 may be executing one or more communication applications, each associated with a respective slot cycle index (e.g. by correlation data such as correlation data 200). Access terminal 102 may have identified the particular slot cycle index by determining, among the slot cycle indexes associated with the various communication applications that access terminal 102 is executing, which slot cycle index is associated with the shortest slot cycle.

Access node 104 may further comprise instructions to then negotiate with access terminal 102 to agree on a slot cycle index, perhaps using the requested slot-cycle-index value as a starting point in that negotiation. Finally, access node 104 may comprise instructions to thereafter schedule pages to access terminal 102 according to a slot cycle that is determined by the agreed-upon slot cycle index.

PDSN 106 may be any networking server or other device arranged to carry out the PDSN functions described herein. As such, PDSN 106 may include a communication interface, a processor, and data storage comprising instructions executable by the processor for carrying out those functions. The communication interface may include a wired packet-data interface such as an Ethernet interface for communicating with access node 104 and over PDN 108. Note that, instead or in addition, PDSN 106 may comprise a wireless interface for communicating with access node 104 and over PDN 108. And PDSN 106 may use the same interface or separate interfaces for communicating with access node 104 and for communicating over PDN 108.

PDN 108 may include one or more wide area networks, one or more local area networks, one or more public networks such as the Internet, one or more private networks, one or more wired networks, one or more wireless networks, and/or one or more networks of any other variety. Devices in communication with PDN 108 may exchange data using a packet-switched protocol such as IP, and may be identified by an address such as an IP address.

3. Exemplary Operation

Figure 3:
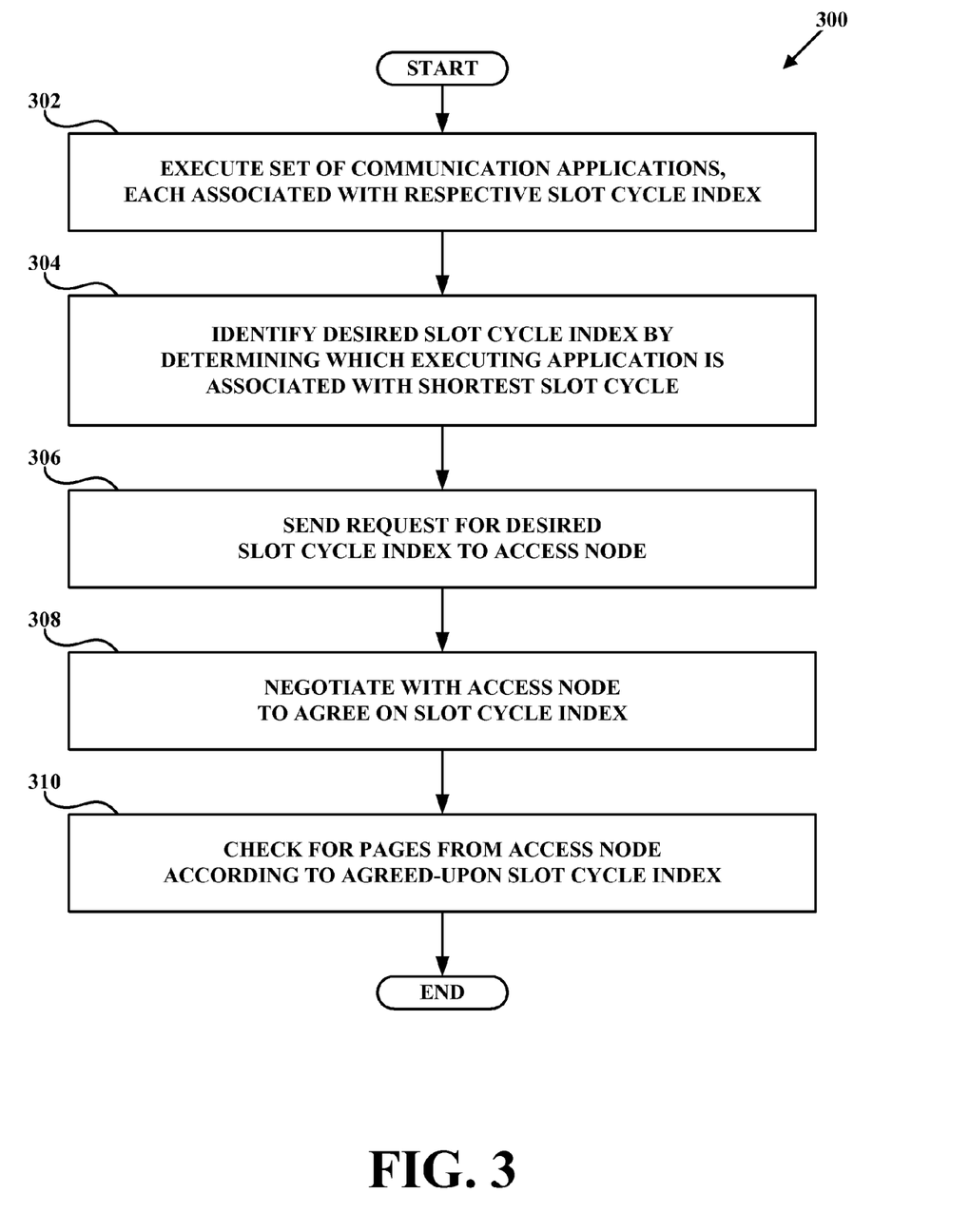
FIG. 3 is a flowchart of a method, in accordance with exemplary embodiments.

FIG. 3 depicts a flowchart of an exemplary method, in accordance with an exemplary embodiment. As shown in FIG. 3, method 300 begins at step 302, when access terminal 102 executes a set of communication applications, each application associated with a respective slot cycle index. At step 304, access terminal 102 identifies a desired slot cycle index at least in part by determining, among the respective slot cycle indexes associated with the set of executing applications, which slot cycle index is associated with the shortest slot cycle.

At step 306, access terminal 102 sends a request message to access node 104, requesting the desired slot cycle index. At step 308, access terminal 102 negotiates with access node 104 to agree on a negotiated slot cycle index. At step 310, access terminal 102 checks for pages from access node 104 according to a slot cycle that is determined at least in part by the negotiated slot cycle index. These steps are further explained in the following subsections.

i. Access Terminal Executes a Set of Communication Applications

At step 302, access terminal 102 executes a set of communication applications, where each application associated with a respective slot cycle index. As explained above, access terminal 102 may store a set of correlation data 200 that correlates each of a set of communication applications with a particular slot cycle index. So, in this example, a user of access terminal 102 may have launched all three applications listed in FIG. 2: the PTT application, the IM application, and the web browser. Note that other applications could be executed instead of or in addition to those three. As a non-exhaustive list of examples, one or more of the following could be executed: a VoIP application, a high-performance push-to-talk (HPPTT) application, a streaming-video application, a streaming-audio application, a video-telephony application, and an FTP application.

ii. Access Terminal Identifies Desired Slot Cycle Index

At step 304, access terminal 102 identifies a desired slot cycle index at least in part by determining, among the respective slot cycle indexes associated with the set of executing applications, which slot cycle index is associated with the shortest slot cycle. Thus, using the example given above, if access terminal is executing the PTT application (associated with a slot cycle index of −2 (and, consistent with the other examples given herein, thus associated with a slot cycle of 0.32 seconds)), the IM application (associated with a slot cycle index of 0 and thus with a slot cycle of 1.28 seconds), and the web browser (associated with a slot cycle index of 2 and thus with a slot cycle of 5.12 seconds). Therefore, in this example, of the communication applications that access terminal 102 is executing, the PTT application is associated with the shortest slot cycle, and the desired slot cycle index would be determined to be −2.

In some embodiments, access terminal 102 may identify the desired slot cycle index in response to detecting a change in the set of applications that it is executing. Thus, access terminal may be operating using a first slot cycle index. Then, access terminal 102—perhaps at least in part at the instruction of its user—may launch a particular application or group of applications, close a particular application or group of applications, and/or otherwise change the set of communication applications that it is currently executing.

In this example, before this change in the set of executing applications, the most latency-sensitive executing application was associated with the first slot cycle index. After the change, the most latency-sensitive of the then-executing applications is associated with a second slot cycle index, which is not equal to the first slot cycle index (and could be less than or greater than the first slot cycle index). As a result of detecting this change, access terminal 102 identifies the second slot cycle index as the desired slot cycle index in step 304.

Note that access terminal 102, may, in some embodiments, be configured to initially operate using a default slot cycle index. Preferably, this default slot cycle index would be the one associated with the longest slot cycle. In the example scenarios described herein, this would mean that the default slot cycle index value would be 2, associated with a slot cycle of 5.12 seconds. Typically, then, the desired slot cycle index that is identified in step 304 would be associated with a slot cycle that is shorter than the slot cycle that is associated with the default slot cycle index.

iii. Access Terminal Requests Desired Slot Cycle Index

At step 306, access terminal 102 sends a request message to access node 104, requesting the desired slot cycle index that was identified in step 304. This request message could take many forms and be according to any suitable protocol. Along with the desired slot cycle index, this request message could include an indication of the one or more communication applications that access terminal 102 is executing, is about to execute, and/or wishes to execute.

iv. Access Terminal and Access Node Negotiate to Agree on a Slot Cycle Index for the Access Terminal At step 308, access terminal 102 negotiates with access node 104 to agree on a negotiated slot cycle index. This negotiated slot cycle index could be equal to the desired slot cycle index that access terminal 102 identified in step 304 and requested in step 306; however, the negotiated slot cycle index could also be different than that desired slot-cycle-index value. If the two values are different, it would most often (though not necessarily always) be the case that the negotiated value would be associated with a longer slot cycle than would the desired value. That is, the access node would typically grant the requested slot cycle index if possible, or award a value that is associated with a longer slot cycle, perhaps during times of heavy loading on a particular carrier frequency in a particular sector. In cases where access terminal 102 does not get the slot cycle index that it requests, it may decide to terminate (or not launch) one or more particular communication applications.

v. Access Terminal Uses the Agreed-Upon Slot Cycle Index

At step 310, access terminal 102 checks for pages from access node 104 according to a slot cycle that is determined at least in part by the negotiated slot cycle index. Thus, according to the example numbers used herein, if the slot cycle index that was negotiated in step 308 was 0, then access terminal 102 may operate using a slot cycle of 1.28 seconds. Correspondingly, access node 104 would then preferably schedule pages to access terminal 102 according to that same slot cycle. And many other examples are possible as well.

4. Conclusion

Various exemplary embodiments have been described above. Those skilled in the art will understand, however, that changes and modifications may be made to those examples without departing from the scope of the claims.

What is claimed is:

1. A method comprising:
    an access terminal receiving a user command to launch a particular communication application;
    the access terminal identifying a desired slot cycle index at least in part by determining, among a set of slot cycle indexes respectively associated with a set of communication applications, wherein the set of communication applications comprises the particular communication application, which slot cycle index is associated with the particular communication application;
    the access terminal sending a request message to an access node, requesting the desired slot cycle index;
    the access terminal negotiating with the access node to agree on a negotiated slot cycle index;
    wherein the negotiated slot cycle index is not equal to the desired slot cycle index, and wherein the negotiated slot cycle index is associated with a longer slot cycle than is the desired slot cycle index; and
    the access terminal, in response to the value of the negotiated slot cycle index, not launching the particular communication application.

2. The method of claim 1, wherein the access terminal comprises at least one device selected from the group consisting of a cellular telephone, a personal digital assistant, a computer, a laptop computer, and a hybrid access terminal.

3. The method of claim 1, wherein the access node comprises a radio network controller and at least one base transceiver station.

4. The method of claim 1, further comprising the access terminal sending the access node an indication of the particular communication application.

5. The method of claim 1, wherein, before receiving the user command, the access terminal was operating according to a first slot cycle index, wherein the particular communication application is associated with a second slot cycle index, and wherein the first slot cycle index is not equal to the second slot cycle index.

6. The method of claim 1, further comprising the access terminal checking for pages from the access node according to a slot cycle that is determined at least in part by the negotiated slot cycle index; and the access node scheduling pages to the access terminal according to the same slot cycle.

7. The method of claim 1, further comprising the access terminal initially operating according to a default slot cycle index, wherein the default slot cycle index is associated with a default slot cycle, wherein the desired slot cycle index is associated with a desired slot cycle, and wherein the desired slot cycle is shorter than the default slot cycle.

8. The method of claim 1, wherein at least one of the desired slot cycle index and the negotiated slot cycle index equals 2, 1, 0, −1, or −2, wherein a slot cycle index of 2 corresponds to a slot cycle of 5.12 seconds, wherein a slot cycle index of 1 corresponds to a slot cycle of 2.56 seconds, wherein a slot cycle index of 0 corresponds to a slot cycle of 1.28 seconds, wherein a slot cycle index of −1 corresponds to a slot cycle of 0.64 seconds, and wherein a slot cycle index of −2 corresponds to a slot cycle of 0.32 seconds.

9. The method of claim 1, wherein the access terminal and the access node communicate with each other according to an Evolution Data Optimized (EV-DO) protocol.

10. The method of claim 1, wherein the set of communication applications comprises at least one application selected from the group consisting of a Voice over Internet Protocol (VoIP) application, a push-to-talk (PTT) application, a high-performance push-to-talk (HPPTT) application, an instant-messaging (IM) application, a streaming-video application, a streaming-audio application, a video-telephony application, a best-effort application, a web-browsing application, and a file transfer protocol (FTP) application.

11. An Evolution Data Optimized (EV-DO) access terminal comprising:

an EV-DO wireless-communication interface;

a processor; and data storage comprising instructions executable by the processor to:

receive a user command to launch a particular communication application;

identify a desired slot cycle index at least in part by determining, among a set of slot cycle indexes respectively associated with a set of communication applications, wherein the set of communication applications comprises the particular communication application, which slot cycle index is associated with the particular communication application;

send a request message to an EV-DO access node, requesting the desired slot cycle index;

negotiate with the access node to agree on a negotiated slot cycle index wherein the negotiated slot cycle index is not equal to the desired slot cycle index, and wherein the negotiated slot cycle index is associated with a longer slot cycle than is the desired slot cycle index: and in response to the value of the negotiated slot cycle index, not launch the particular communication application.

12. The access terminal of claim 11, wherein the access terminal comprises at least one device selected from the group consisting of a cellular telephone, a personal digital assistant, a computer, a laptop computer, and a hybrid access terminal.

13. The access terminal of claim 11, wherein, before receiving the user command, the access terminal was operating according to a first slot cycle index, wherein the particular communication application is associated with a second slot cycle index, and wherein the first slot cycle index is not equal to the second slot cycle index.

* * * * *